US007091831B2

(12) United States Patent
Crenshaw et al.

(10) Patent No.: US 7,091,831 B2
(45) Date of Patent: Aug. 15, 2006

(54) METHOD AND APPARATUS FOR ATTACHING POWER LINE COMMUNICATIONS TO CUSTOMER PREMISES

(75) Inventors: Ralph E. Crenshaw, Crownsville, MD (US); David W. Grimes, Oxford, MD (US); L. Peter Larson, Annapolis, MD (US); Andrew Pozsgay, Germantown, MD (US)

(73) Assignee: Telkonet Communications, Inc., Germantown, MD (US)

( * ) Notice: Subject to any disclaimer, the term of this patent is extended or adjusted under 35 U.S.C. 154(b) by 135 days.

(21) Appl. No.: 10/898,930

(22) Filed: Jul. 27, 2004

(65) Prior Publication Data

US 2005/0046550 A1 Mar. 3, 2005

Related U.S. Application Data

(63) Continuation-in-part of application No. 10/823,551, filed on Apr. 14, 2004, which is a continuation-in-part of application No. 10/219,811, filed on Aug. 16, 2002, now Pat. No. 6,975,212.

(60) Provisional application No. 60/326,205, filed on Oct. 2, 2001, provisional application No. 60/326,204, filed on Oct. 2, 2001.

(51) Int. Cl.
*G08B 11/01* (2006.01)

(52) U.S. Cl. .......................... 340/310.17; 340/310.16; 340/638

(58) Field of Classification Search ................ 340/310.15–310.17, 310.11
See application file for complete search history.

(56) References Cited

U.S. PATENT DOCUMENTS

| 3,771,069 A | 11/1973 | Levacher |
| 3,846,638 A | 11/1974 | Wetherell |
| 3,924,223 A | 12/1975 | Whyte |
| 4,130,861 A | 12/1978 | LaForest |
| 4,142,178 A | 2/1979 | Whyte |
| 4,188,619 A | 2/1980 | Perkins |
| 4,417,207 A | 11/1983 | Sato |
| 4,429,299 A | 1/1984 | Kabat |
| 4,602,240 A * | 7/1986 | Perkins et al. ............. 307/3 |
| 4,622,535 A | 11/1986 | Ise |
| 4,636,771 A | 1/1987 | Ochs |
| 4,644,320 A | 2/1987 | Carr et al. |

(Continued)

FOREIGN PATENT DOCUMENTS

EP 0 756 785 B2 7/1998

(Continued)

*Primary Examiner*—Donnie L. Crosland
(74) *Attorney, Agent, or Firm*—VolentineFrancos&Whitt PLLC

(57) ABSTRACT

A method and apparatus for modifying a power distribution network in a building in order to provide data communication by using a Power Line Carrier (PLC) signal to an approximate electrical central location point of a power distribution system remote from the data entry point of the building. A passive coupler device is attached to a centrally located service panel. The passive coupler receives the Power Line Carrier (PLC) signal from the remote entry point in the building and conditions the signal for entry at the service panel onto each phase of the power distribution network.

20 Claims, 9 Drawing Sheets

U.S. PATENT DOCUMENTS

| | | | |
|---|---|---|---|
| 4,675,648 A | 6/1987 | Roth et al. | |
| 4,772,870 A | 9/1988 | Reyes | |
| 4,815,106 A | 3/1989 | Propp | |
| 4,835,517 A | 5/1989 | van der Gracht et al. | |
| 4,845,466 A | 7/1989 | Hariton | |
| 5,066,939 A | 11/1991 | Mansfield | |
| 5,101,191 A * | 3/1992 | MacFadyen et al. | 375/259 |
| 5,206,777 A | 4/1993 | Clarey et al. | |
| 5,210,519 A | 5/1993 | Moore | |
| 5,257,006 A | 10/1993 | Graham et al. | |
| 5,351,272 A | 9/1994 | Abraham | |
| 5,369,356 A * | 11/1994 | Kinney et al. | 324/142 |
| 5,394,402 A | 2/1995 | Ross | |
| 5,406,249 A * | 4/1995 | Pettus | 370/389 |
| 5,491,463 A | 2/1996 | Sargeant | |
| 5,559,377 A | 9/1996 | Abraham | |
| 5,592,482 A | 1/1997 | Abraham | |
| 5,623,542 A | 4/1997 | Schneider et al. | |
| 5,684,450 A * | 11/1997 | Brown | 370/493 |
| 5,717,685 A | 2/1998 | Abraham | |
| 5,740,175 A | 4/1998 | Wakeman | |
| 5,774,526 A | 6/1998 | Propp | |
| 5,805,053 A | 9/1998 | Patel et al. | |
| 5,818,127 A | 10/1998 | Abraham | |
| 5,828,293 A | 10/1998 | Rickard | |
| 5,864,284 A | 1/1999 | Sanderson | |
| 5,903,553 A | 5/1999 | Sakamoto | |
| 5,929,749 A | 7/1999 | Slonim | |
| 5,929,750 A | 7/1999 | Brown | |
| 5,933,071 A | 8/1999 | Brown | |
| 5,933,073 A * | 8/1999 | Shuey | 375/258 |
| 5,949,327 A | 9/1999 | Brown | |
| 5,977,650 A | 11/1999 | Rickard | |
| 5,978,371 A | 11/1999 | Mason, Jr. et al. | |
| 5,994,998 A | 11/1999 | Fisher et al. | |
| 6,005,477 A | 12/1999 | Deck | |
| 6,014,386 A | 1/2000 | Abraham | |
| 6,023,106 A | 2/2000 | Abraham | |
| 6,037,678 A | 3/2000 | Rickard | |
| 6,040,759 A | 3/2000 | Sanderson | |
| 6,091,722 A | 7/2000 | Russell | |
| 6,104,707 A | 8/2000 | Abraham | |
| 6,115,429 A | 9/2000 | Huang | |
| 6,130,896 A | 10/2000 | Lueker | |
| 6,144,292 A | 11/2000 | Brown | |
| 6,172,597 B1 | 1/2001 | Brown | |
| 6,205,495 B1 | 3/2001 | Gilbert | |
| 6,252,503 B1 | 6/2001 | Berger | |
| 6,252,952 B1 | 6/2001 | Kung | |
| 6,255,935 B1 | 7/2001 | Lehmann | |
| 6,272,551 B1 | 8/2001 | Martin et al. | |
| 6,282,405 B1 | 8/2001 | Brown | |
| 6,288,631 B1 | 9/2001 | Shinozaki | |
| 6,297,730 B1 | 10/2001 | Dickinson | |
| 6,384,580 B1 | 5/2002 | Ochoa et al. | |
| 6,396,392 B1 | 5/2002 | Abraham | |
| 6,396,841 B1 | 5/2002 | Co | |
| 6,404,348 B1 | 6/2002 | Wilfong | |
| 6,404,773 B1 | 6/2002 | Williams | |
| 6,407,987 B1 | 6/2002 | Abraham | |
| 6,417,762 B1 | 7/2002 | Comer | |
| 6,480,748 B1 | 11/2002 | Gerszberg | |
| 6,483,870 B1 | 11/2002 | Locklear | |
| 6,504,851 B1 | 1/2003 | Abler | |
| 6,560,234 B1 | 5/2003 | Ben-Michael | |
| 6,590,493 B1 * | 7/2003 | Rasimas et al. | 340/538.12 |
| 6,614,326 B1 * | 9/2003 | Merriman et al. | 333/100 |
| 6,686,832 B1 | 2/2004 | Abraham | |
| 6,741,439 B1 | 5/2004 | Parlee | |
| 6,756,776 B1 | 6/2004 | Perkinson | |
| 6,809,633 B1 | 10/2004 | Cern | |
| 6,842,668 B1 | 1/2005 | Carson | |
| 6,885,674 B1 | 4/2005 | Hunt | |
| 6,950,567 B1 | 9/2005 | Kline | |
| 6,958,680 B1 | 10/2005 | Kline | |
| 6,975,212 B1 | 12/2005 | Crenshaw et al. | |
| 2002/0075097 A1 | 6/2002 | Brown | |
| 2002/0186699 A1 | 12/2002 | Kwok | |
| 2003/0016631 A1 | 1/2003 | Piner | |

FOREIGN PATENT DOCUMENTS

| | | |
|---|---|---|
| JP | 362274829 A | 11/1987 |
| JP | 5145450 | 6/1993 |
| JP | 405316000 A | 11/1993 |
| WO | WO 00 07304 | 6/2000 |
| WO | WO 01 67630 | 9/2001 |

* cited by examiner

METHOD AND APPARATUS FOR ATTACHING POWER LINE COMMUNICATIONS TO CUSTOMER PREMISES

This application is a continuation-in-part and claims priority to U.S. patent application Ser. No. 10/823,551, filed Apr. 14, 2004, which is a continuation-in-part of prior U.S. patent application Ser. No. 10/219,811, filed Aug. 16, 2002, now U.S. Pat. No. 6,975,212, which claims the benefit of U.S. Provisional Patent Application No. 60/326,205, filed Oct. 2, 2001 entitled "Method and Apparatus for Attaching Powerline Communications to Customer Premises" and claims benefit of U.S. Provisional Patent Application No. 60/326,204, filed Oct. 2, 2001, the contents of which are incorporated by reference in their entirety.

FIELD OF THE INVENTION

The invention relates to methods and systems for coupling communication systems to power line.

BACKGROUND OF THE INVENTION

The ability to interconnect computers and other intelligent devices is a common requirement wherever people live and work today. The electrical connection required to form this local area network (LAN) has traditionally been accomplished by installing dedicated data wiring both inside buildings and between clusters of buildings. A number of wireless (i.e. radio) methods have also been developed and deployed to address this need.

More recently, technology to allow electric power wiring infrastructure to simultaneously transport data at high rates has been realized. This Power Line Carrier (PLC) technology typically uses modulated radio frequency (RF) signals below 50 MHz conducted on the power wiring to transport the data.

There are significant practical advantages offered by PLC technology—namely that electrical wiring, of necessity, must be installed and that data connectivity can therefore be immediately added at little (or no) additional cost, particularly in existing buildings. Similarly, electrical outlets are ubiquitous within modem buildings and significant operating convenience is realized when data is simultaneously available at every outlet.

Another advantage of PLC technology is that the range that can be achieved is significantly greater than wireless methods, particularly in commercial buildings constructed of heavier materials that severely attenuate wireless signals. Yet another advantage of PLC technology over wireless methods is that the data is inherently more secure since a physical connection is required to join the network.

Most contemporary LANs are configured in a "hub and spoke" topology where a central server device supports a number of users and also provides a gateway to the Wide Area Network (WAN) and/or the Internet. Maximum utility for a PLC network is obtained when its' physical configuration mirrors the logical topology of the LAN, i.e. when the PLC gateway is effectively located at the "electrical center" of the space such that every outlet is served with the best possible PLC signal. This point is often a rarely accessed electrical panel in a service closet or the basement and is almost never co-located with other data processing equipment.

Another important issue, particularly in commercial buildings, is that 3-phase electrical power/wiring is commonly used and adequate coverage of a PLC network within the building is achieved only when all three phases are excited with the PLC signal.

Yet another related issue arises during the installation of PLC networks in environments that have natural barriers to the signals (or block them entirely). A common situation is where a building has been modified and all sections no longer share a common source of electrical power. Another common situation is where power is supplied from a central point and then distributed to sections of the space via transformers, often for purposes of distribution efficiency or electrical isolation. In view of the above, new methods and systems are desirable to better utilize power lines for communication purposes.

SUMMARY OF THE INVENTION

In one aspect, a device for interfacing a communication signal with an electrical power network in a building having at least one service panel includes a coupling device configured to couple a modulated communication signal to a power-line network; and one or more resettable breakers each configured to allow for manual disconnect and configured to provide over-current protection, the one or more resettable breakers each being electrically coupled to the coupling device and configured to be electrically coupled to the electrical power network. Such a device eliminates the need of separate fusing and cut-off mechanisms and providing enhanced integration and economy.

In another aspect, a device for interfacing a communication signal with an electrical power network in a building having at least one service panel includes a coupling device configured to couple a modulated communication signal to a power-line network, and an electrical breaking means coupled to the coupling device for providing manual disconnect and over-current protection. Such a device also eliminates the need of separate fusing and cut-off mechanisms and providing enhanced integration and economy.

In yet another aspect, a device for interfacing a communication signal with an electrical power network in a building having at least one service panel includes a coupling means for coupling a modulated communication signal to a power-line network and an electrical breaking means coupled to the coupling device for providing manual disconnect and over-current protection. Such a device again eliminates the need of separate fusing and cut-off mechanisms and providing enhanced integration and economy.

In still another aspect, a method for interfacing a communication signal with an electrical power network in a building having at least one service panel includes providing communication coupling between a communication device and a power-line network via modulated communication signals and using a coupler located in a first box, and providing a manual electrical cut-off capacity in the first box.

There has thus been outlined, rather broadly, certain embodiments of the invention in order that the detailed description thereof herein may be better understood, and in order that the present contribution to the art may be better appreciated. There are, of course, additional embodiments of the invention that will be described or referred to below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Embodiments of the current invention are directed to improving data connectivity afforded by PLC technology. While the carrier current coupler apparatus described here provides the means to effect the physical connection to the building power wiring, much of the improvement derives from identifying the appropriate point(s) at which to inject the PLC signal.

One common objective is to inject the PLC signal from a single, centralized device (often called a "gateway") into the building wiring in such a way that all receptacles in the building receive adequate signal for a second device (often called a "terminal") plugged in there to function properly. The attenuation of PLC signals along arbitrary runs of wiring is difficult to predict and highly variable so it is generally not possible to supply all receptacles with equal signal levels. A more achievable objective is to have the building and all of its' receptacles taken together as a system be well-behaved, i.e. where no single receptacle is completely cut off from the PLC signal and where the signal amplitude decreases in a reasonably predictable fashion with distance from the signal injection point.

Figure 1:
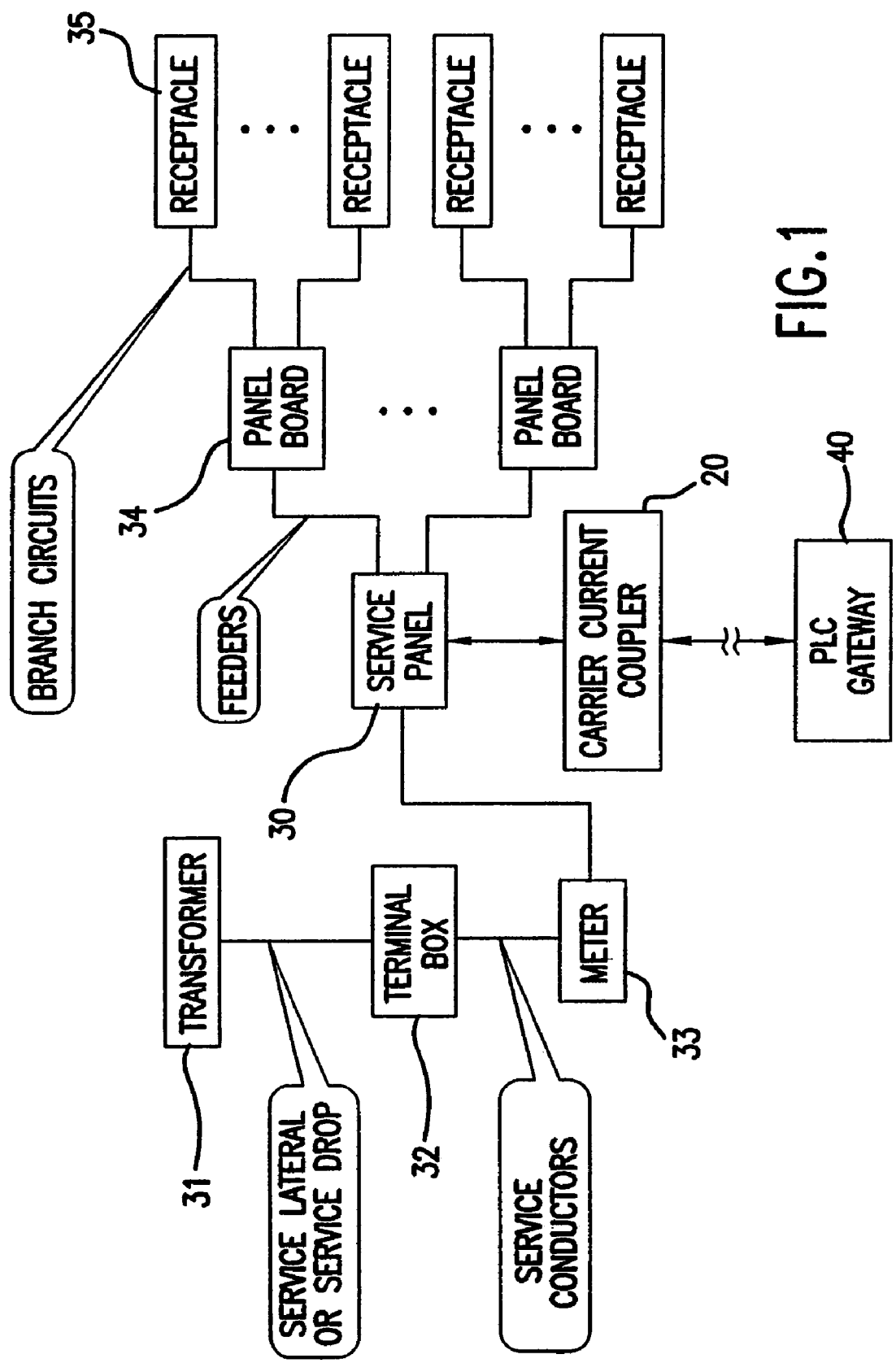
FIG. 1 is a simplified block diagram illustrating how electrical power is supplied to and distributed within buildings.

FIG. 1 shows a simplified block diagram of a building power distribution system and will be used to illustrate the above discussion. Electricity from the utility mains enters the facility via step down transformer (31) through terminal box (32) and is measured for billing purposes by meter (33). It is then conducted to service panel (30) where it is split and further directed to many receptacles (35) via panel boards (34). It is certainly possible to inject the gateway PLC signal at any of the above numbered points however the optimal point is probably service panel (30) because it symmetrically feeds all of the receptacles (35). PLC signal attenuated along the wiring from transformer (31) (if injected there) to the service panel (30) is entirely wasted since no terminal devices will ever be connected there. Similarly, injecting the gateway signal at one of the receptacles (35) could be workable but is probably not optimal since the receptacles are probably not symmetrically distributed about any given one.

Figure 2:
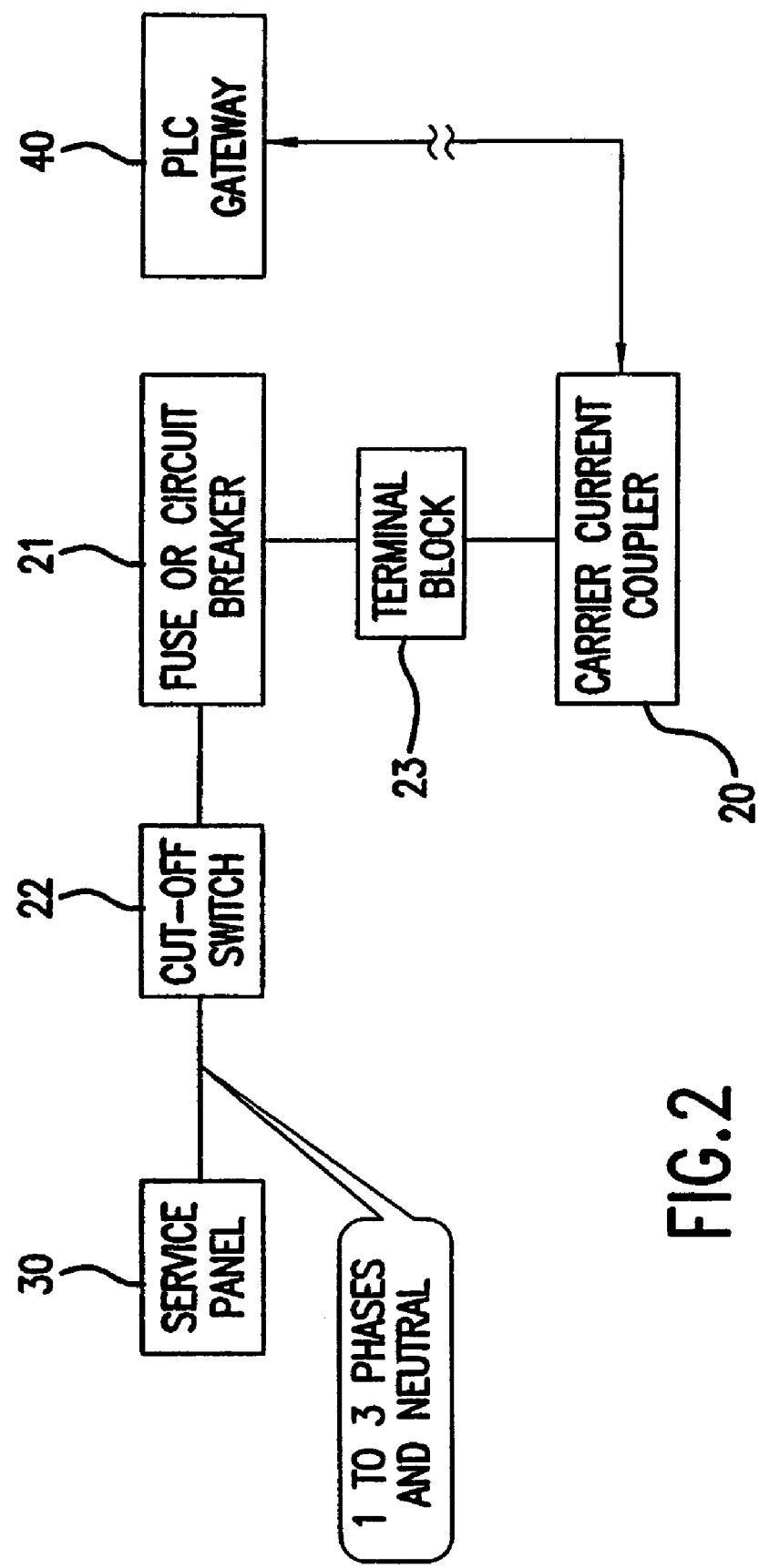
FIG. 2 expands a portion of FIG. 1 and illustrates how and where the coupler constructed in accordance with the present invention is positioned connected.

An optimized system which maximizes use of the passive coupler arrangement is to connect the carrier current coupler (20) to service panel (30), inject the PLC signal from gateway (40) into the building at that point and measure the data throughput performance at a number of receptacles by any commonly available means. FIG. 2 illustrates the details of making that connection.

Referring to FIG. 2, service panel (30) is the same as discussed previously. Accepted electrical safety requirements prescribed in the National Electrical Code require that a cut-off switch (22) and fuse/circuit breaker (21) be installed. Even though only minute PLC signal currents are expected to flow along this path, the cut-off switch (22) is necessary to protect service personnel from the power line voltage during installation/maintenance and the fuse/circuit breaker protects the building in event of a catastrophic failure of the carrier current coupler (20). Terminal block (23) provides a convenient attachment point for the wiring.

Figure 3:
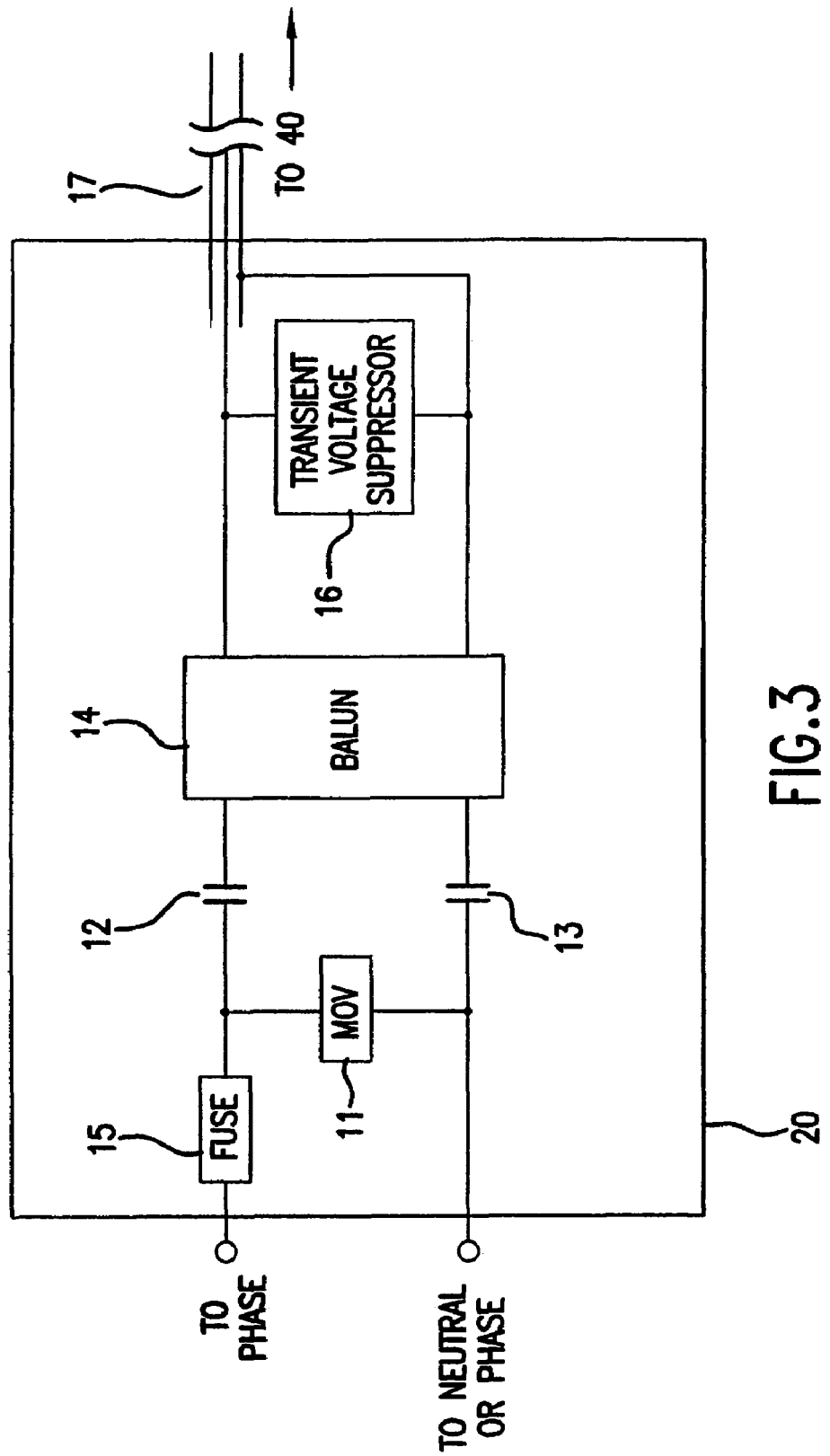
FIG. 3 is a schematic of the coupler according to the present invention.

An additional dimension to be considered is the common use of 3-phase power in commercial buildings. In this case, service panel (30) contains 3 hot wires (often referred to as "L1", "L2" and "L3"), a neutral and a ground wire. The object of the original building wiring plan was to balance the load across all 3 phases so roughly ⅓ of the receptacles (35) downstream will ultimately be connected to each of L1, L2 and U. Therefore, to provide PLC signals to all receptacles, the signal must be split and fed to all 3 phases simultaneously. FIG. 3 illustrates such connection.

FIG. 3 shows the internal details of the carrier current coupler (20). The single-ended PLC signal from the gateway is conducted via coaxial cable (17) and subsequently coupled to each power phase via balun transformer (14) and capacitor (12). Capacitor (13) is optional and may or may not be used. Metal oxide varistor [MOV] (11) is used to suppress power line transients that might cause damage to the electronics in the gateway (40). Additional protection to the gateway electronics is provided by transient voltage suppressor (16). A second fuse (15) (generally rated at very low amperage) is used to further protect against short circuit failure of MOV (11). The circuit including capacitor (12), fuse (15) and MOV (11) is simply replicated to feed all 3 phases.

Figure 3B:
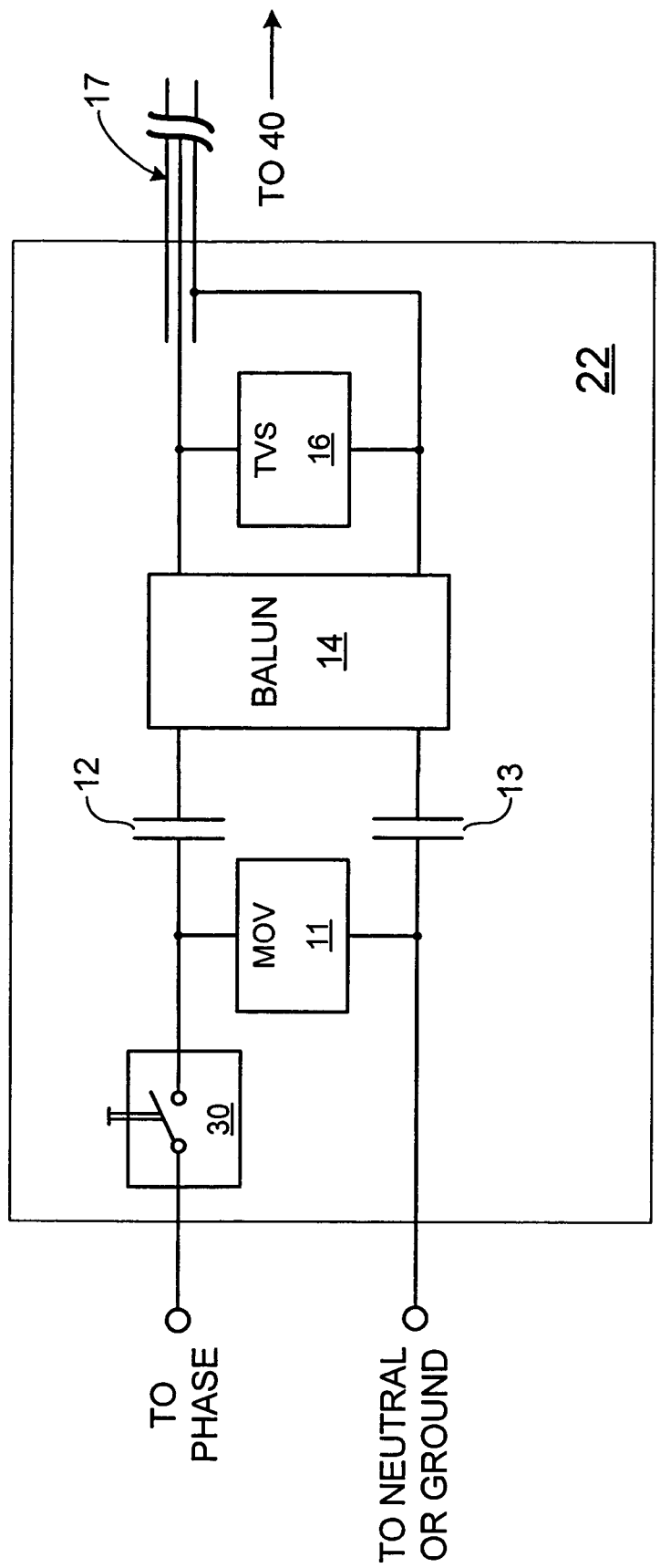
FIG. 3B depicts a variant of the schematic of FIG. 3.

FIG. 3B depicts an integrated current coupler 22, which is a variant of the current coupler 20 of FIG. 3. As shown in FIG. 3B, the integrated current coupler 22 is substantially identical to current coupler 20 but uses a resettable circuit-breaker 30 in place of a fuse.

The resettable circuit-breaker 30 can provide all the functionality of a fuse in that it can provide protection from over-current situations with the extra advantage of being easily reset, as opposed to replaced. Still further, using a circuit-breaker fulfils the manual cut-off switching requirement of the national electric code as well as the fused disconnect requirement. Accordingly, use of a resettable circuit-breaker in the present circumstances can negate the need for a separate cut-off switch, such as the cut-off switch shown in FIG. 2. This leads to reduced costs by elimination of a separate cut-off switch box, the labor of installation, the labor of connecting a cut-off switch box to a coupler and the reduced maintenance whenever an over-current event occurs that might otherwise require the replacement of a fuse.

Figure 5:
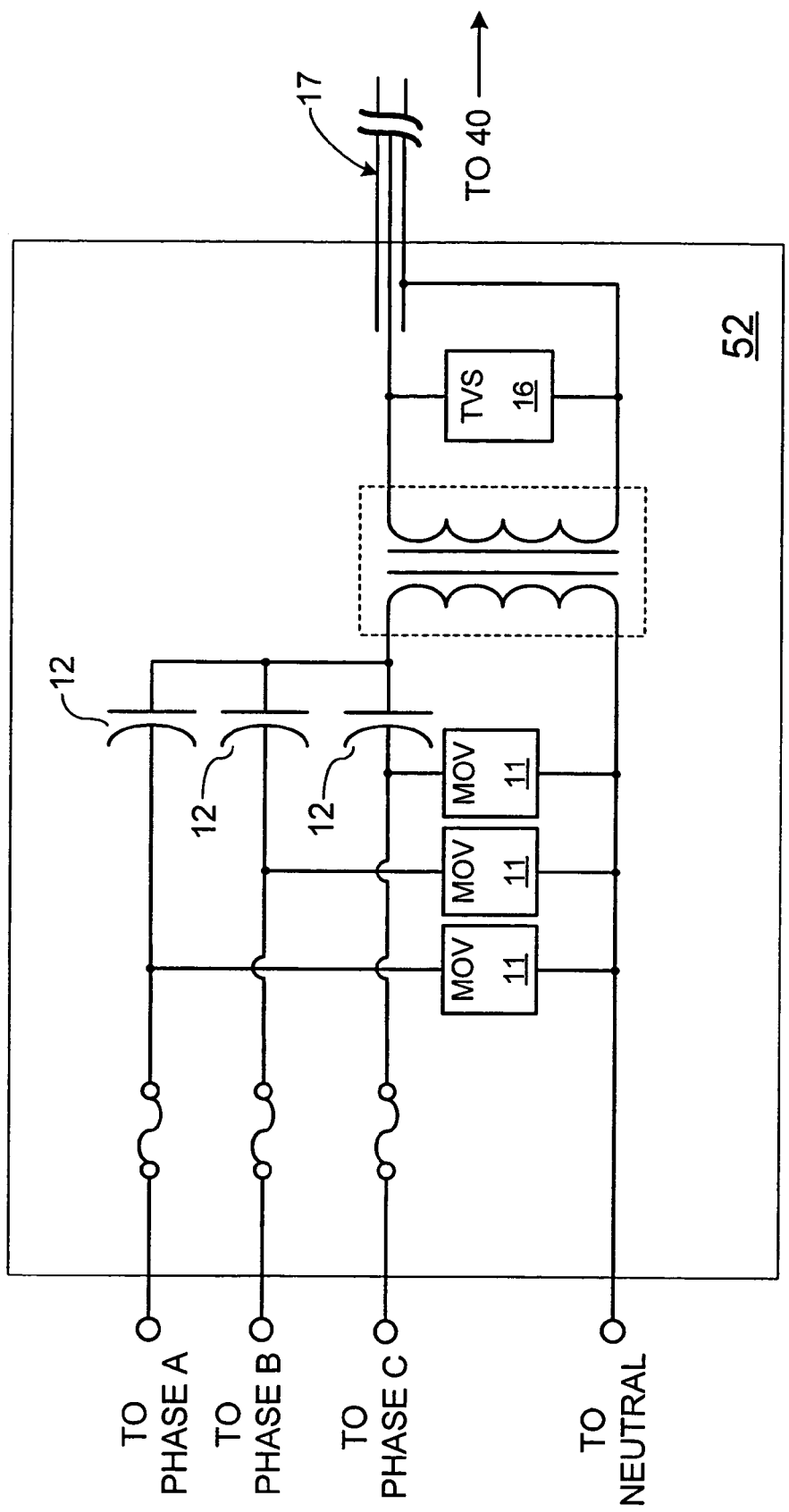
FIG. 5 is a schematic of a coupler configuration for use in a 3-phase Wye-connected power network.

FIG. 5 illustrates a detailed circuit configurations when the power network is a Wye-connected 3-phase power network. In a Wye-connected 3-phase network, each single-phase receptacle (35) is connected to the Neutral and one of the 3 phases (A, B, or Q. In the circuit 20' of FIG. 5, the 3 phases are essentially connected together in the frequency range of the communications signal by capacitors (12). Therefore, by connecting the communications signal across the Neutral and the combination node (52), the signal is from balun transformer 14' coupled across the two terminals of each receptacle (35).

Figure 6:
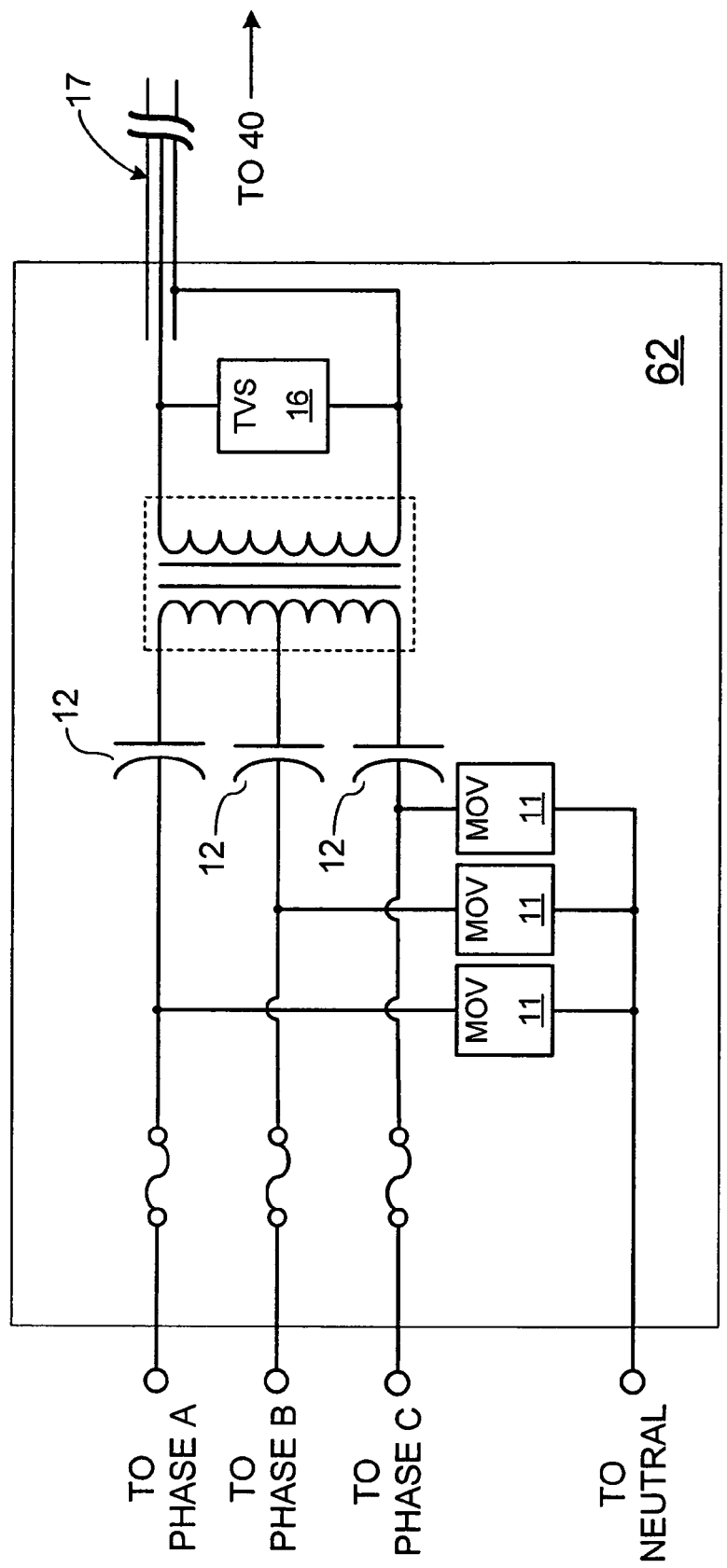
FIG. 6 is a schematic of a coupler configuration for use in a 3-phase Delta-connected power network.

FIG. 6 illustrates a detailed circuit configuration when the power network is a Delta-connected 3-phase network. The circuit 20" addresses the modification required to avoid having 2 terminals of each receptacle (35) being connected together in the frequency range of the communication signal which would prevent signal coupling.

In order to couple the communications signal to all receptacles (35) in a Delta network, it is necessary to provide a signal voltage differential across all combinations of phases: A and B, B and C, & C and A. This can be accomplished with the circuit 20" of FIG. 6. An unavoidable consequence of this circuit is the fact that the turns ratio from the Gateway (40) to one of the phase combinations (in this case A-C) is one half the turns ratio from the Gateway (40) to the other two phase combinations (in this case A-B and B-C). To help remedy the situation, the number of turns in the phase windings (61,62) of balun transformer 20" can be adjusted in relation to the number of turns in the Gateway (40) winding (63), such that the signal coupling effectiveness between the Gateway (40) and all 3 two-phase combinations is as near to equal as is practical.

Figure 4:
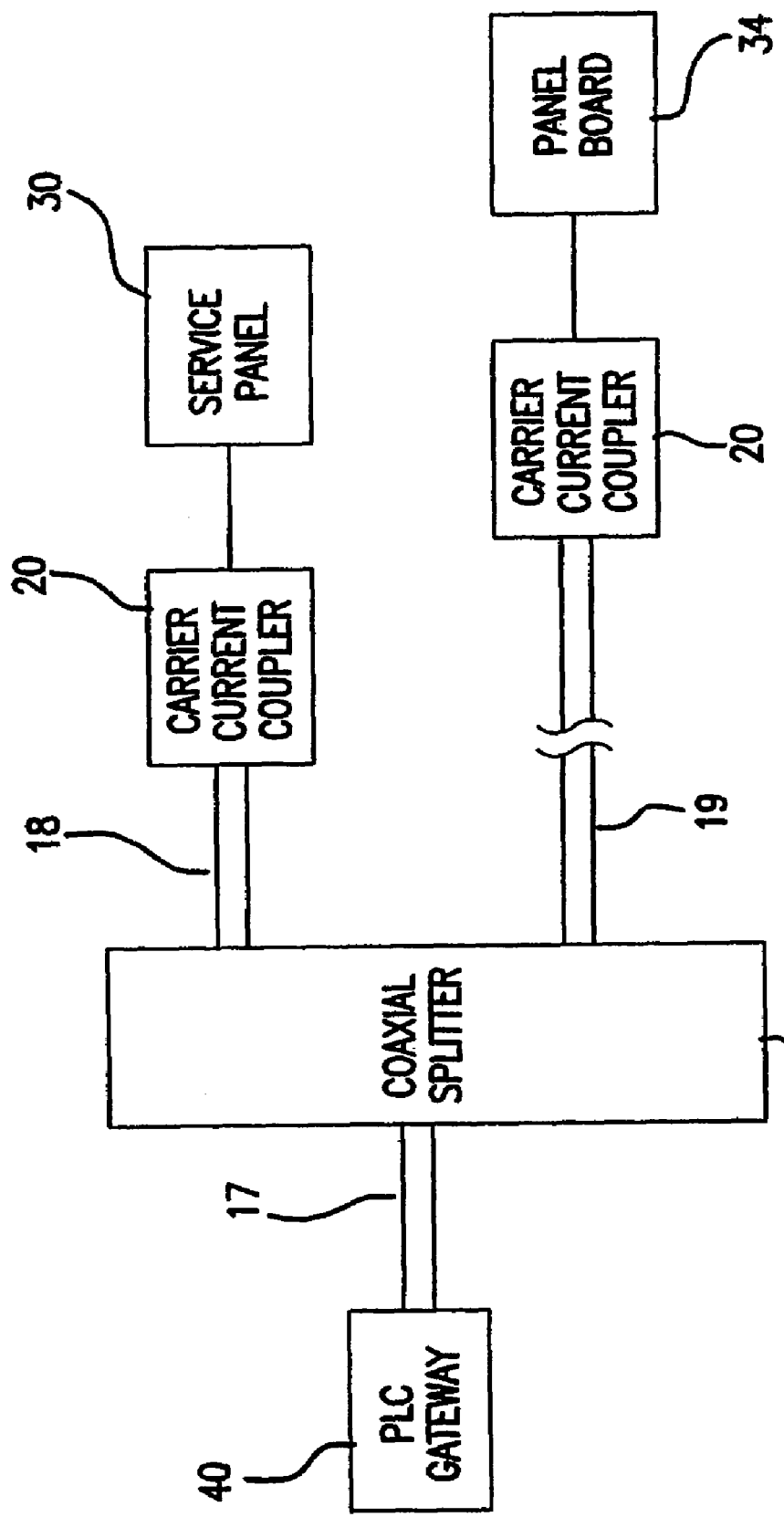
FIG. 4 details an arrangement for improving PLC signal coverage and is an embodiment of the invention for buildings having portions which are isolated with respect to communication data.

If installation is completed as discussed previously and acceptable data throughput results are obtained, no further work is necessary. On the other hand, one may find (referring once again to FIG. 1) that some receptacles (35) will not have adequate PLC signal. Assume for the purposes of this example that many of the receptacles (35) fed by one particular panel board (34) do not deliver adequate data throughput performance. It may be possible by observation and/or analytical means to determine why such is the case and remedy the situation. However, details of existing wiring behind walls and/or the history of prior modifications made to a building may not be readily apparent. FIG. 4 ("Multi-point PLC Signal Injection") illustrates a solution to this problem according to another embodiment afforded by the present invention.

Figure 5B:
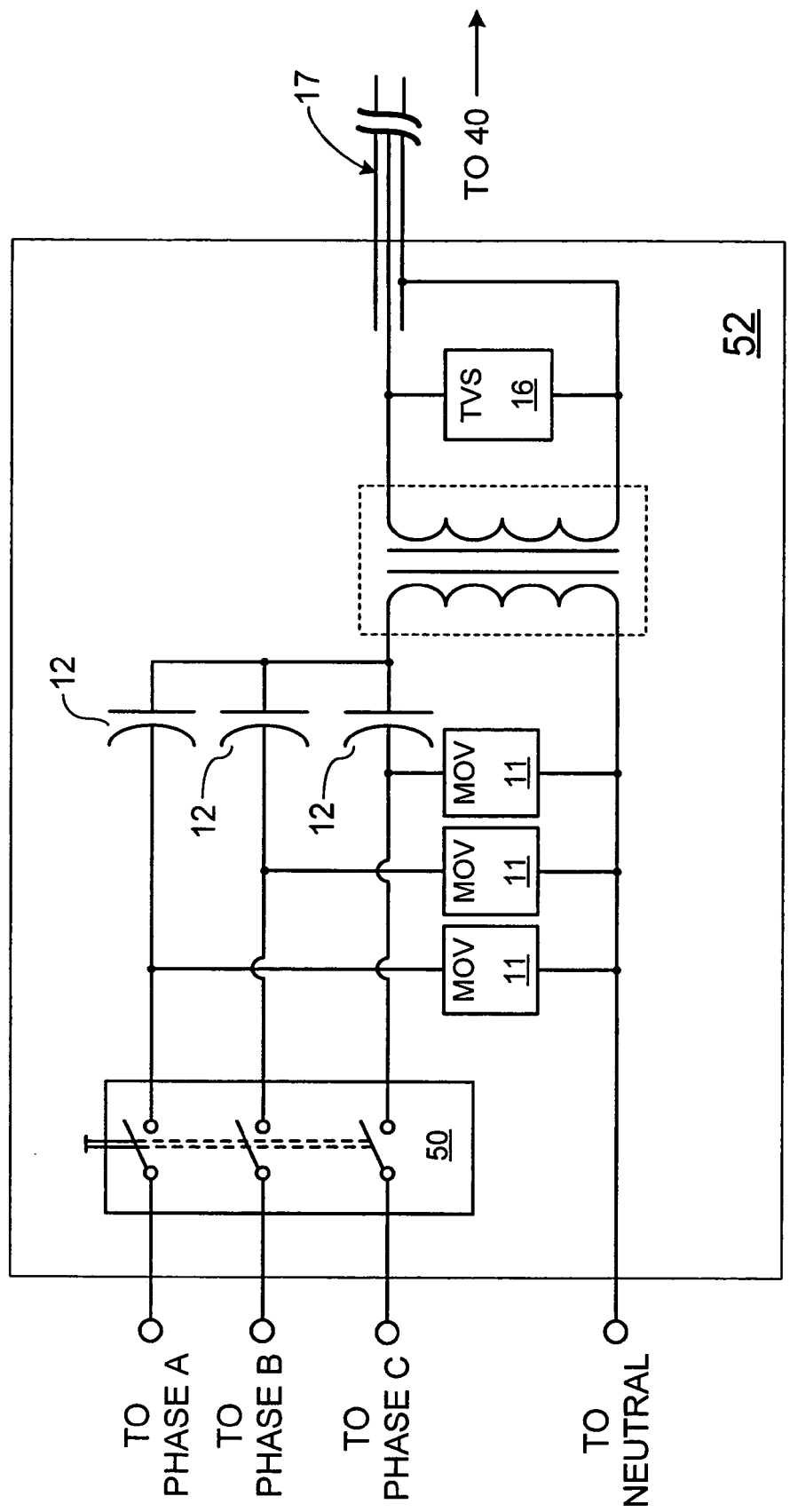
FIG. 5B depicts a variant of the schematic of FIG. 5.
Figure 6B:
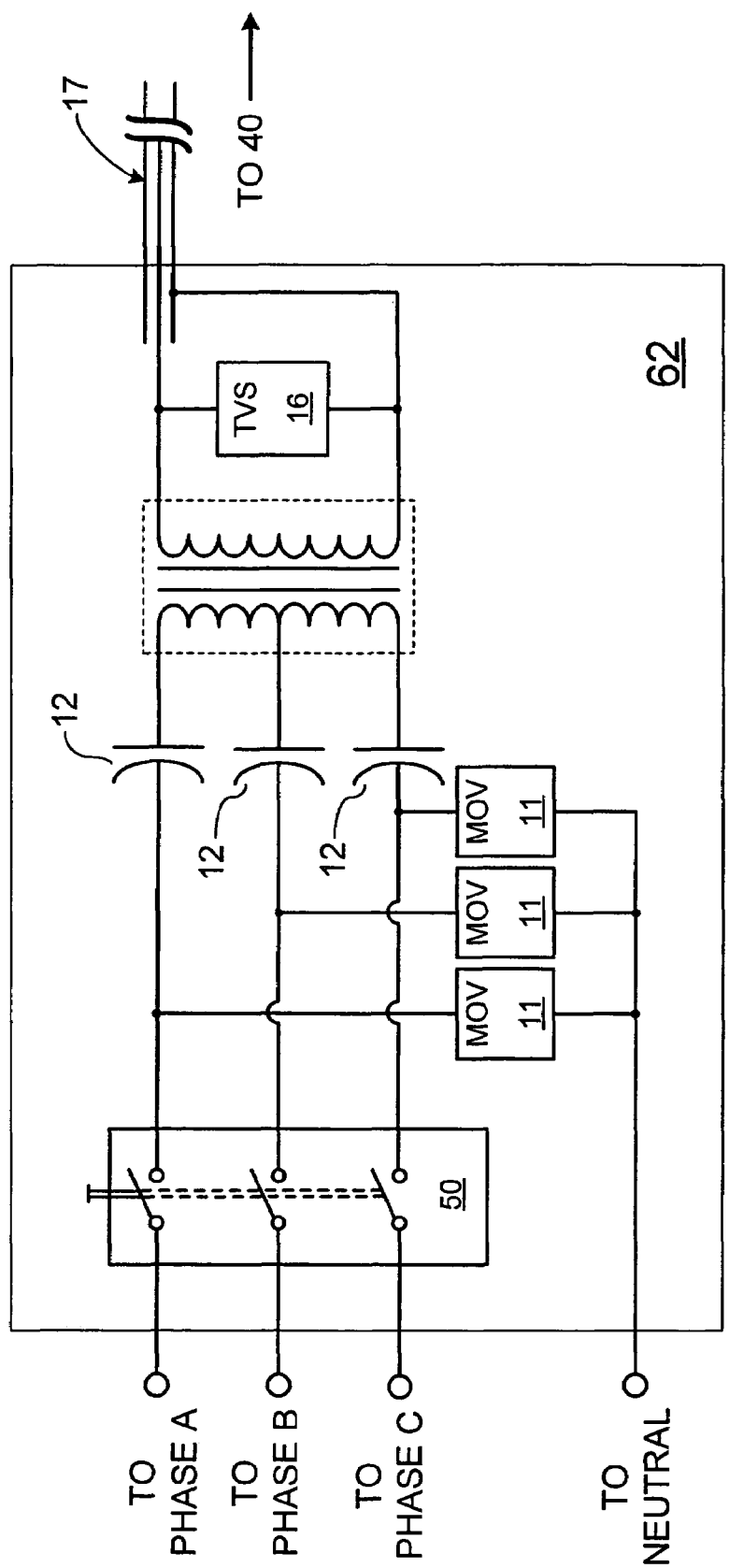
FIG. 6B depicts a variant of the schematic of FIG. 6.

FIG. 5B depicts a second integrated current coupler 52 appropriate for Wye-connected 3-phase power network and is a variant replacement of the current coupler 20 of FIG. 5. As shown in FIG. 5B, the second integrated current coupler 52 is substantially identical to current coupler of FIG. 5 but uses a resettable circuit-breaker 50 in place of a fuse. Similarly, FIG. 6B depicts a second integrated current coupler 52 appropriate for Delta-connected 3-phase power network and is a variant replacement of the current coupler 20 of FIG. 6. As shown in FIG. 6B, the second integrated current coupler 62 is substantially identical to current coupler of FIG. 6 but uses a resettable circuit-breaker 50 in place of a fuse.

The exemplary resettable circuit-breaker 50 of both FIGS. 5B and 6B is a three-pole resettable circuit-breaker capable of simultaneously connecting/disconnecting all three power phase lines from the rest of the coupler 52 or 62. However, in other embodiments, it should be appreciated that separate circuit breakers may be used. As with the coupler 22 of FIG. 3B, the present resettable circuit-breaker 50 can provide all the functionality of a number of fuses with the extra advantages of being easily reset. Accordingly, as with the coupler 20 of FIG. 3B, the couplers 52 and 62 of FIGS. 5B and 6B can eliminate the need of a separate cut-off switch and the costs associated.

FIG. 4 shows a PLC signal simultaneously injected at some point in addition to service panel (30) to remedy a coverage issue. Coaxial splitter (50) is a commonly available and inexpensive device used in cable TV systems to split a broadband signal for use at two or more locations. These devices may likewise be used to split a PLC signal. In this example, the PLC signal output of gateway (40) along coaxial cable (17) is split and directed via individual coaxial cables (18) and (19) to two carrier current couplers (20), one installed at service panel (30) as before and another at the particular panel board (34) having receptacles (35) with inadequate performance. In so doing, whatever physical issues prevented the original PLC signal from reaching this particular panel board are circumvented. Further, since all of the PLC signal power still remains inside the building, the only loss is the minimal attenuation which occurs in the coaxial splitter (50) itself. The effect of this process is therefore to provide adequate signal coverage where before there was none and to slightly reduce the signal amplitude in the rest of the space. Any number of variations of this technique can then be employed to address specific PLC signal coverage issues as they are subsequently discovered.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A coupling system for enabling the efficient communication between a communication device and communication system embedded in an electrical power network in a building, the electrical power network having at least a first service panel residing in the building, the coupling device eliminating the need of separate fusing and cut-off mechanisms and providing enhanced integration and economy, the coupling system comprising:

an electronic network that includes one or more carrier current couplers each providing an electrical interface between the communication device and a respective power wire of the electrical power network at the first service panel, wherein each carrier current coupler is configured to enable the transmission of communication signals between the communication device and a respective power wire; and one or more resettable breakers each configured to allow for manual disconnect and configured to provide over-current protection, the one or more resettable breakers each being electrically coupled to the electronic network and configured to be electrically coupled to the electrical power network.

2. The system according to claim 1, wherein the communication device is a gateway.

3. The system according to claim 2, wherein the communication device is a gateway forming a hub-and-spoke network topology.

4. The system according to claim 3, wherein the electrical power network is a multi-phase electrical power network, and wherein the communication device is configured to provide a broadband signal, and the electronic network is configured to split the broadband signal and feed it to each power wire of the electrical power network.

5. The system according to claim 1, wherein the electronic network receives the first communication signal from the communication device via a coaxial cable.

6. The system according to claim 1, wherein the power network includes a plurality of service panels, and the first service panel is electrically the most centrally located of the service panels.

7. The system according to claim 1, wherein the electronic network is physically co-located with the service panel.

8. The system according to claim 1, wherein the power network employs voltages of at least 277 volts.

9. The device of claim 1, wherein the power network is a single-phase power system.

10. The device of claim 9, wherein only one single-pole circuit-breaker is used to couple the coupling device to the power-line network.

11. The device of claim 1, wherein the power network is a three-phase power system.

12. The device of claim 11, wherein only one three-pole circuit-breaker is used to couple the coupling device to the power-line network.

13. The device of claim 11, wherein at least one single-pole circuit-breaker is used to couple the coupling device to the power-line network.

14. The device of claim 11, wherein at least one multiple-pole circuit-breaker is used to couple the coupling device to the power-line network.

15. The device of claim 14, wherein the communication device is a gateway forming a hub-and-spoke network topology.

16. The device of claim 15, wherein only one three-pole circuit-breaker is used to couple the coupling device to the power-line network.

17. The device of claim 15, wherein at least one single-pole circuit-breaker is used to couple the coupling device to the power-line network.

18. The device of claim 15, wherein at least one multiple-pole circuit-breaker is used to couple the coupling device to the power-line network.

19. A coupling system for enabling the efficient communication between a communication device and communication system embedded in an electrical power network in a building, the electrical power network having at least a first service panel residing in the building, the coupling device eliminating the need of separate fusing and cut-off mechanisms and providing enhanced integration and economy, the coupling system comprising:

an electronic network that includes one or more carrier current couplers each providing an electrical interface between the communication device and a respective power wire of the electrical power network at the first service panel, wherein each carrier current coupler is configured to enable the transmission of communication signals between the communication device and a respective power wire; and an electrical breaking means electrically coupled to the electronic network for providing manual disconnect and over-current protection from the electrical power network.

20. A coupling system for enabling the efficient communication between a communication device and communication system embedded in an electrical power network in a building, the electrical power network having at least a first service panel residing in the building, the coupling device eliminating the need of separate fusing and cut-off mechanisms and providing enhanced integration and economy, the coupling system comprising:

a coupling means for coupling a modulated communication signal originating from the communication device to the electrical power network, the coupling means enabling the transmission of communication signals between the communication device and a respective power wire; and an electrical breaking means electrically coupled to the electronic network for providing manual disconnect and over-current protection from the electrical power network.

* * * * *